May 5, 1970 J. S. REID ET AL 3,509,999
WASTE DISPOSAL SYSTEM
Filed Sept. 19, 1967 3 Sheets-Sheet 3
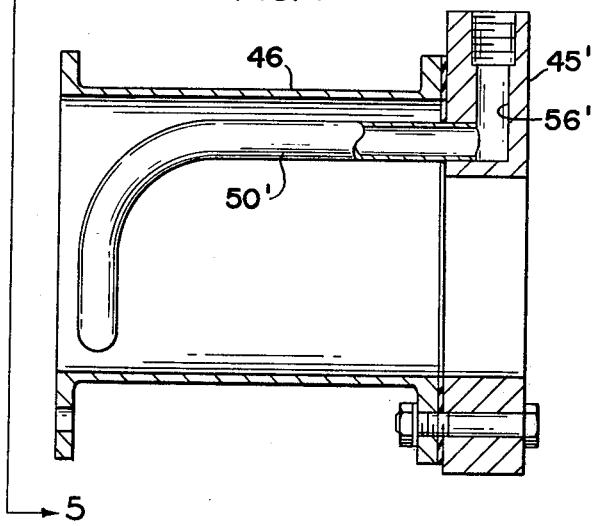
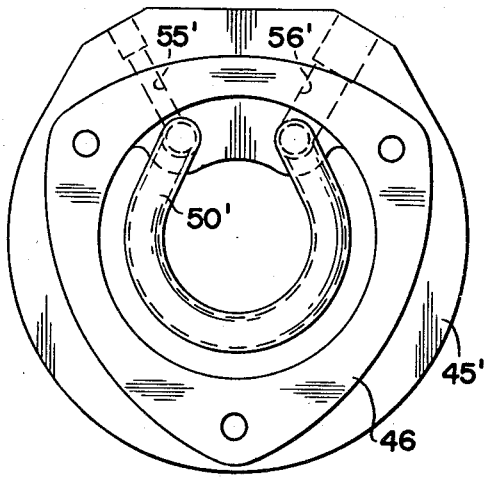
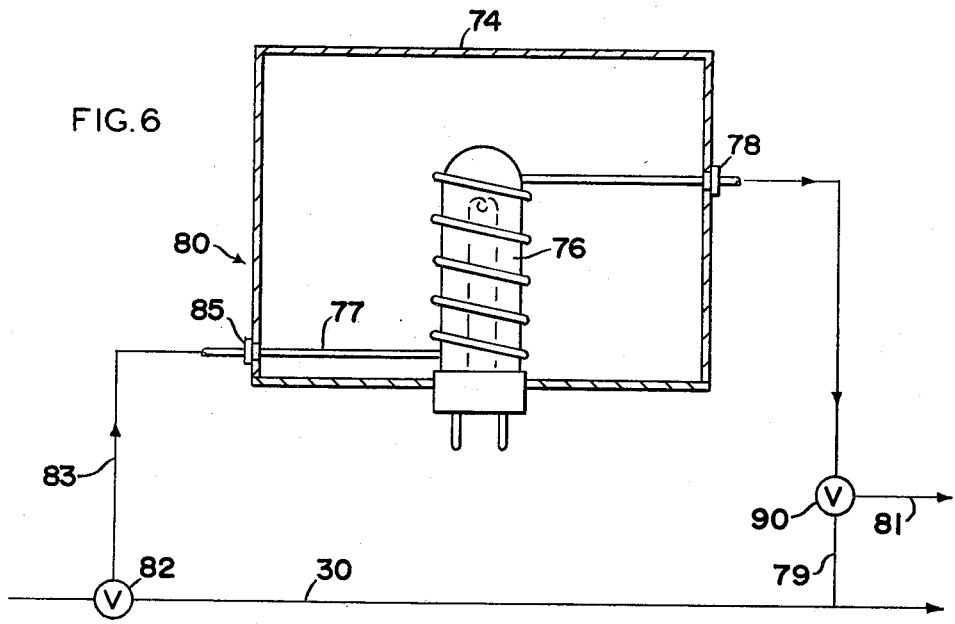
INVENTORS
JAMES S. REID
HARRY W. GREEN
BY
Meyer, Tilberry & Body
ATTORNEYS.

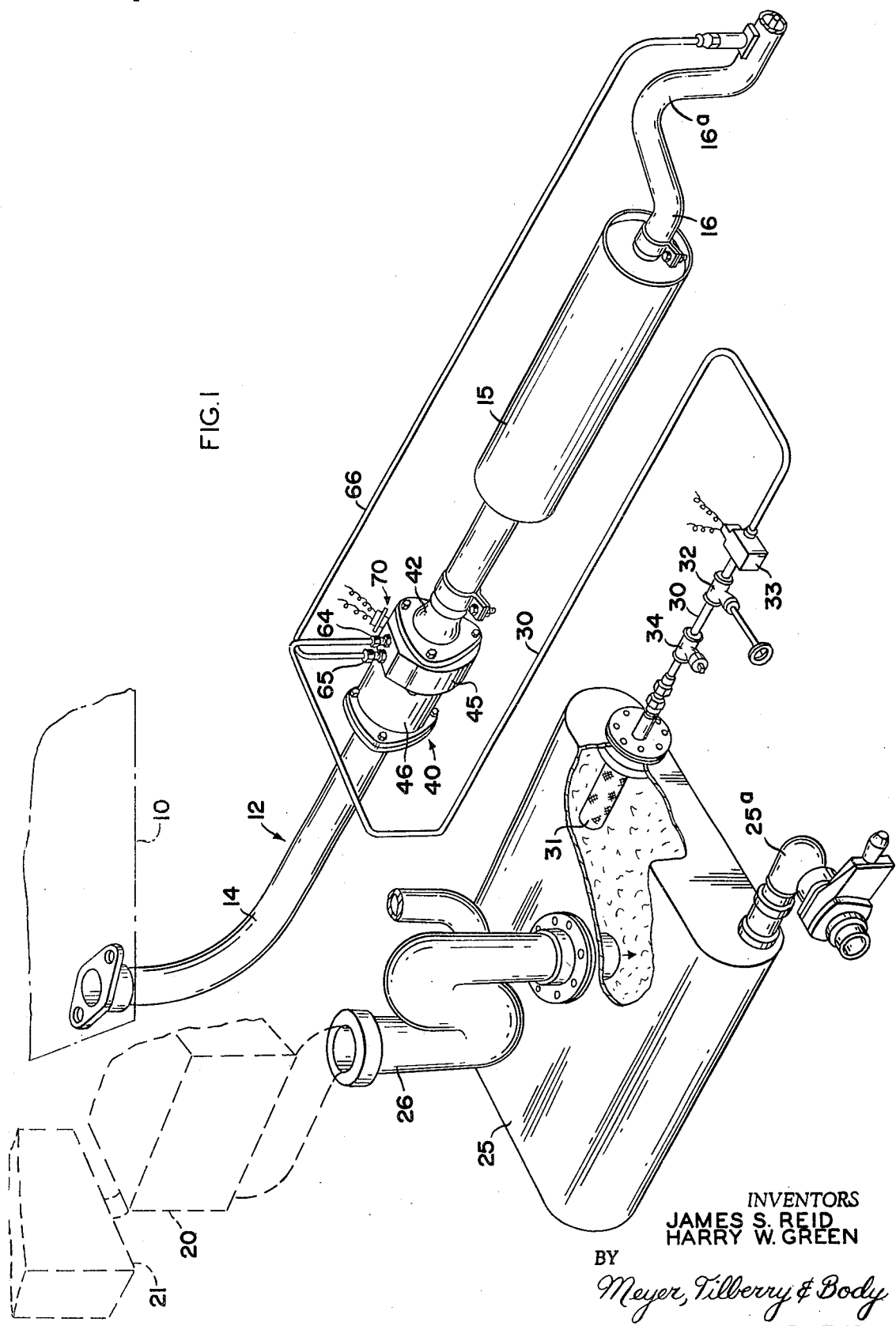

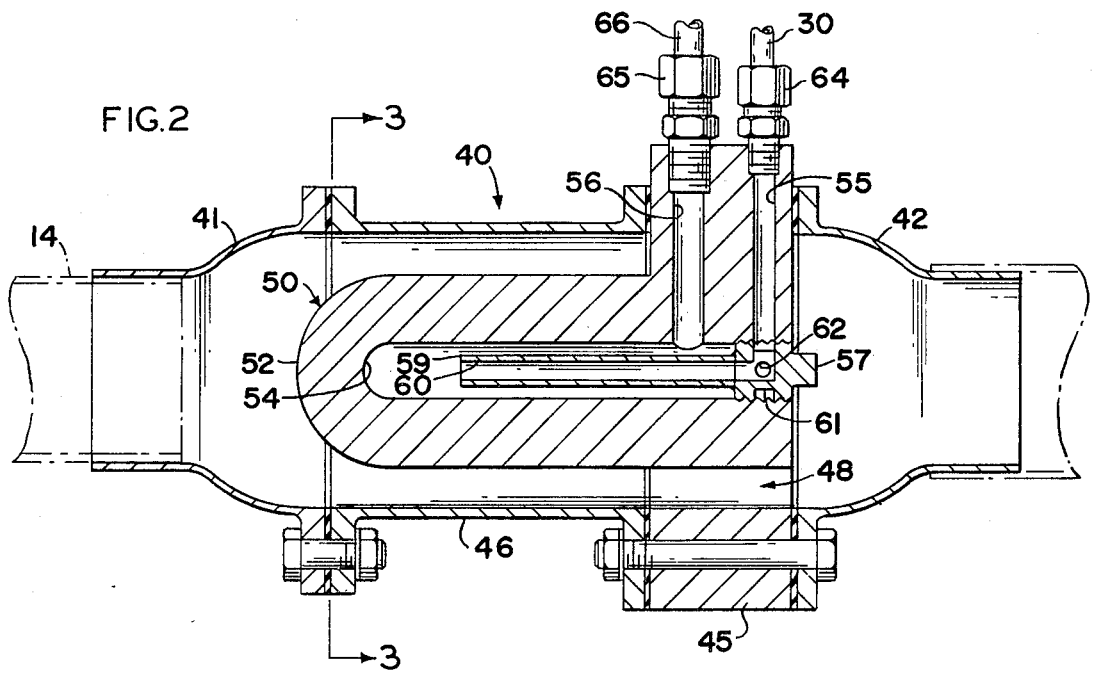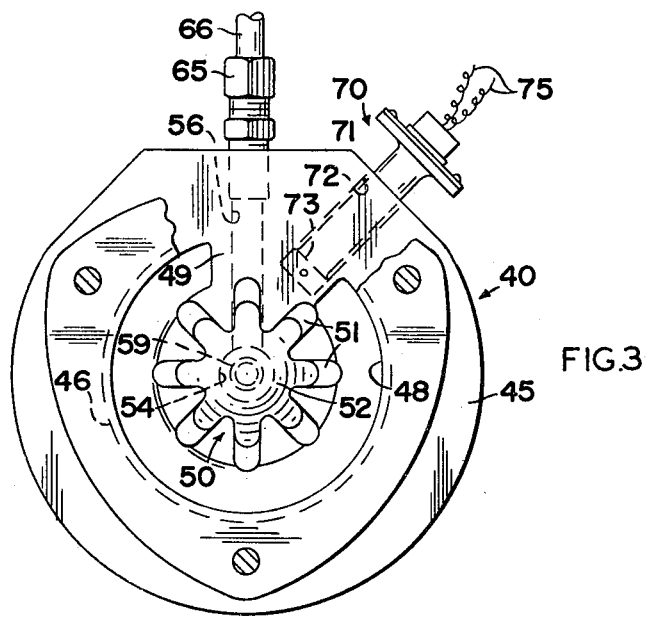

United States Patent Office 3,509,999
Patented May 5, 1970

3,509,999
WASTE DISPOSAL SYSTEM
James S. Reid, Hudson, and Harry W. Green, North Olmstead, Ohio, assignors to The Standard Products Company, Cleveland, Ohio, a corporation of Ohio
Filed Sept. 19, 1967, Ser. No. 668,874
Int. Cl. B01d 1/14
U.S. Cl. 210—149                                    11 Claims

ABSTRACT OF THE DISCLOSURE

A waste disposal system in which the exhaust system of a vehicular unit is employed to supply heat to a dissipatus tube located internally of the exhaust system thereby to vaporize and purify liquid waste material. A source of ultraviolet energy may also be employed in the system as a second source of purification.

---

This invention relates generally to improvements in waste disposal systems and, more particularly, to a disposal system especially designed for the disposal of human waste and/or other like disposable waste products.

Although not limited thereto, the waste disposal system of the present invention has particular utility for use in vehicular units such as buses, trucks, the more recently developed mobile homes, house trailers, boats and various other types of vehicles utilized for human transportation. However, as will be hereinafter apparent, the instant disposal system may also find utility in domestic housing installations or the like where a conventional sewage system such as is presently in use in most large municipalities is not available.

Heretofore, in waste disposal systems especially designed for use in vehicular units and the like, one of the more important factors which has limited the range and/or the use of such vehicles for extended transportation, is the fact that said systems merely accumulate or collect the waste material. Consequently, inasmuch as these systems have a limited capacity and period of use, the vehicle associated therewith likewise is comparatively limited for its intended purpose.

Still another limiting factor in the use of presently available vehicle disposal systems is that it must function as a completely self-contained unit to prevent any harmful waste material and/or odors from being discharged into the atmosphere. This is particularly true in land type vehicles and likewise in water borne craft where laws have been established to prevent the discharge of waste material into the atmosphere and/or public bodies of water.

In view of the above disadvantages, as well as others known to the art, the use of such systems has been obviously limited.

There is disclosed in copending application Ser. No. 454,416, filed May 10, 1965, now U.S. Pat. No. 3,342,337, and assigned to the assignee herein, an improved waste disposal system which overcomes many of the shortcomings of the prior art and is particularly applicable for use in vehicular units and the like. The system is operable over extended periods of time without any evidence of an accumulation of waste material which would limit its period of use. Further, the waste disposal system disclosed in that application is a completely self-contained unit whereby its operation prevents any contaminants from being discharged into the atmosphere and provides for the disposal of human waste products and/or the like while the vehicle is in transit.

The waste disposal system which is the subject of the aforementioned application contemplates the use of water closet, a waste tank which functions as a conventional septic tank, a dissipatus drum and a source of heat. The solid materials discharged from the water closet to the waste tank are attacked by anaerobic organisms which turn the solid material into a partially purified fluid solution. This solution is transmitted to the dissipatus drum and thereafter heated and vaporized and dissipated into the atmosphere either as a purified vapor or pure condensed liquid. The application contemplates that the heat for the dissipatus drum may be provided by the exhaust gases of the engine which powers the vehicular unit.

Although the system disclosed in the aforesaid patent application operates entirely satisfactorily from the standpoint of dissipating the collected waste material in the waste tank, the particular type of dissipatus apparatus disclosed therein does have certain shortcomings in its operation. Thus, when the vehicle is first started, the exhaust gases are not sufficient to heat the drum adequately to dissipate any liquid which may be introduced to the drum. Accordingly, there is a possibility that the drum may become flooded with liquid. Moreover, the particular type of drum disclosed is of a relatively large dimension and it has been found that in certain applications in certain types of vehicles there is an inadequate amount of space in which to accommodate the drum. In addition, the exposure of the exhaust system to the liquid in the drum may cause problems such as warping of the exhaust pipe due to the presence of temperature gradients.

Accordingly, it is a primary object of this invention to provide an improved waste disposal system with improved dissipatus apparatus. In accordance with this aspect of the invention, the dissipatus drum is replaced by an injector tube which may be inserted in the stream of the exhaust gases and which provides a closed circuit whereby the liquid waste is injected into the tube and is vaporized to leave as a purified gas which is subsequently discharged into the tail pipe either as a gas or a condensed liquid.

In accordance with another aspect of the invention, provision is made to control the flow of liquid into the injector tube to prevent flooding of the tube, particularly when the tube is insufficiently heated to vaporize the liquid. Thus, a pump is employed to draw the liquid from the waste tank and inject the liquid into the injector tube with a temperautre actuated pump control switch actuating the pump only after the temperature of the injector tube has reached a predetermined level.

In accordance with still another aspect of the invention, it is contemplated that a germicidal lamp may be employed in combination with the dissipatus tube to provide an additional means for purifying the liquid.

In view of these aspects of the invention, it is a primary object of this invention to provide an improved waste disposal system with an improved means for converting the liquid to a purified vapor.

Another object of the invention is to provide an improved waste disposal system in which the system is operative only after a predetermined temperature has been reached in the vaporizing unit.

A still further object of the invention is to provide auxiliary purifying means in addition to the dissipatus apparatus.

Another object of the invention is to provide dissipatus apparatus which may be inserted in the conventional exhaust system of a vehicular unit and which is compact and requires little space in addition to the space required by the existing exhaust manifold and tail pipe unit for the vehicle.

Additional objects and advantages of the improved waste disposal system of this invention will be aparent to those skilled in the art to which the system pertains and upon reference to the following description and attached drawings wherein like reference numerals indicate like parts in the various views.

FIG. 1 is a perspective view of one embodiment of the improved waste disposal system incorporated for use in a vehicular unit.

FIG. 2 is a longitudinal section through the dissipatus apparatus.

FIG. 3 is a sectional view taken along line 3—3 of FIG. 2.

FIG. 4 is a side elevation view of an alternate form of the dissipatus apparatus.

FIG. 5 is an end elevation view of the apparatus of FIG. 3.

FIG. 6 illustrates, somewhat schematically, the use of a germicidal lamp as auxiliary purification apparatus.

Referring now to FIG. 1, the waste disposal system of the present invention is illustrated as adapted for use with a vehicle unit such as a bus, mobile home, boat or the like and which includes a source of motive power such as a gasoline engine, schematically illustrated at 10. The engine includes the conventional exhaust system for discharging the by-products of combustion from the engine to the atmosphere. Typically this exhaust assembly 12 includes an exhaust conduit 14 connected at one end to the exhaust manifold of the engine and at its opposite end to an elongated muffler device 15 of conventional construction. The opposite end of the muffler normally is connected to one end of a tail pipe 16 with the other end of the tail pipe including an upwardly projecting bend 16a which is somewhat of an inverted U-shaped configuration.

It will be readily understood that the hot exhaust gases emerging from the engine 10 pass through the conduit 14 into the muffler 15 and thence to the tail pipe conduit 16 whereby the gases are discharged to the atmosphere. It is these hot exhaust gases passing through the exhaust system 12 which are utilized to vaporize the fluids produced in the waste disposal system described hereinafter.

With particular reference to FIG. 1, the waste disposal system includes a conventional water closet indicated by the reference numeral 20 which is located in the lavatory of the vehicle unit and which is designed to receive human waste products therein. A suitable flush tank 21 filled with a source of water or other fluids is connected to the water closet and provides the medium whereby the solid products are transported from the water closet to a waste tank shown at 25.

The waste tank 25 may be conveniently located exteriorly of the body of the vehicle unit so as to be readily available for cleaning, maintenance and the like; however, its precise location is a matter of choice and forms no portion of this invention. A drain 25a may be provided on the waste tank 25, preferably adjacent the bottom thereof, to facilitate cleaning of the tank.

The tank 25 is connected through a waste trap conduit 26 of conventional construction to the water closet 20. The waste tank 25 is a closed receptacle and receives the waste products and flushing fluid. The tank is constructed to function as a conventional septic tank whereby, in a manner well known, solid materials are digestively attacked by anaerobic organisms and are thereby turned ultimately, with the fluid, into a partially purified fluid solution.

An outlet conduit assembly, indicated generally by the reference numeral 30, is connected at one end to the waste tank 25 and includes a suitable screen type filter 31 which is located inside the waste tank. The filter 31 defines a liquid level wherein a substantially complete anaerobic process may be performed on the solid waste materials and also functions to prevent any solids from escaping from the tank.

The outlet conduit assembly 30 also includes a suitable shut-off valve 32, an in-line liquid pump 33 and a conventional T-fitting 34 which may be utilized to introduce a cleaning fluid to be passed through the tank in the event periodic maintenance and/or cleaning thereof is desired. The other end of the conduit assembly 30 is connected to a dissipatus apparatus, indicated generally by the reference numeral 40.

The apparatus 40 includes adapter fittings 41, 42 at either end thereof with the fitting 41 being connected to the exhaust conduit 14 and the fitting 42 being connected to the tail pipe 16. Preferably the dissipatus apparatus is positioned in the exhaust assembly upstream of the muffler 15 so as to minimize the dissipation of the heat in the exhaust gases prior to their entry into the apparatus 40. However, in some applications, it may be desirable, or necessary, to place the apparatus downstream of the muffler and this arrangement is contemplated as well.

The dissipatus apparatus includes a base portion 45 and a cylindrical extension 46 secured to the base. The base may conveniently be of a substantially cylindrical configuration and includes an opening 48 passing therethrough. Extending radially into the opening 48 is a support portion 49 integral with the base and which supports a finned dissipatus tube assembly, generally indicated by the reference numeral 50. The finned tube includes radially extending fins 51 which extend longitudinally of the tube, parallel to the path of the gases flowing through the exhaust system. Preferably the nose 52 of the tube 50 is tapered to avoid undue resistance to the flow of the gases in the exhaust system.

The tube 50 further includes a longitudinally extending passage 54 which is closed at its forward end and which is in communication with an inlet passage 55 and an outlet passage 56 extending radially through the support portion 49 of the base. The downstream end of the passage 54 is closed by suitable means, such as a threaded plug 57, thereby defining a closed chamber in the tube 50. An injector tube 59 is supported at one end by the plug 57 and extends longitudinally along a substantial portion of the passage 54. The injector tube includes a central passage 60 which opens outwardly of the other end of the tube 59 and is in communication with the inlet passage 55 at its other end through a groove 61 and port 62 formed in the plug 57.

The inlet passage 55 is connected through a suitable fitting 64 to the conduit assembly 30. Similarly, the outlet passage 56 is connected by a fitting 65 to a conduit which communicates with the tail pipe conduit 16 at a point downstream from the upwardly extending portion 16a.

To introduce liquid from the waste tank 25 to the apparatus 40, the liquid pump 33 is employed. This pump is preferably controlled by a temperature actuated pump control switch, indicated generally by the reference numeral 70, which includes a probe or shank portion 71 received in tap 72 formed in the base 45. The tap 72 extends into the support portion 49 which is connected to the tube 50 with a conductive material 73 at the juncture of the probe and the bottom of the tap 72 so that the temperature of the gases and the surrounding portions of the dissipatus apparatus may be sensed by the switch 70. The switch is connected by appropriate electrical leads 75 to the pump 33 whereby upon sensing a predetermined temperature level, the switch actuates the pump to introduce liquid to the apparatus 40.

The waste disposal system operates in the following manner. Waste material is deposited in the waste tank 25 where, as above-described, it is converted into a partially purified fluid solution. When the level of liquid waste in the tank has risen to the level of the filter 31 and it is desired to dispose of this liquid material, the fluid is pumped by the pump 33 to the dissipatus tube 50. However, before the pump may be actuated, it is necessary that the engine 10 be running a sufficient amount of time that the temperature in the exhaust system, and particularly the temperature adjacent to the dissipatus tube, has risen to a predetermined level wherein the pump control switch 70 is actuated to start the pump 33. Thereafter, liquid is pumped through the conduit 30 through the inlet passage 55 and injected into the dissipatus tube 50 through the injection tube 59. The liquid introduced through the tube 59 boils and substantially vaporizes due to the elevated temperature of the tube 50 caused by the stream of hot gaseous exhaust products passing through the exhaust assembly. The resulting vapor passes out of the dissipatus apparatus through the outlet passage 56 into the conduit 66 where it becomes cooled and reverts partially, or substantially, to a fluid form.

Normally, the conduit 66 is angularly directed downwardly toward the terminal portion of the tail pipe 16 so that the condensed fluid in the conduit 66 flows gravitationally toward the tail pipe where it is mixed with the exhaust gases and dissipated into the atmosphere. Since the fluid in the dissipatus apparatus is vaporized and subsequently condensed, it is purified so that the resultant gases or liquid discharged into the atmosphere through the tail pipe do not create any health hazards.

Several advantages are apparent with this improved disposal system. Thus, the dissipatus tube provides a completely closed circuit through which the liquid waste is passed and vaporized. No portion of the exhaust system is subjected to contact with the liquid waste material thereby avoiding any problems of corrosion or the imposition of stresses by the contact of a cool liquid with a hot metallic surface. In addition, the dissipatus tube constitutes a more efficient means of vaporizing the liquid and the pump actuated switch assures that the liquid is injected into the tube only after a satisfactory temperature level is available to vaporize the liquid. The pump in the system functions both as a valve to prevent the flow of liquid to the tube when the tube is below temperature and, also, as a positive means of assuring the injection of a continuous quantity of liquid to expedite the disposal of the waste material.

Referring now to FIG. 4, an alternate embodiment of the dissipatus apparatus is illustrated. In this embodiment, the dissipatus tube 50 is replaced by a loop-shaped tube 50' with one end of the loop being in communication with an inlet passage 55' formed in the base 45' and the other end of the loop is in communication with the outlet passage 56'. The apparatus may include the cylindrical extension 46 secured to the base which, in effect, provides a housing for the tube 50'. As shown in FIG. 4, the tube extends longitudinally of the housing 46 over a portion of its length and is then bent downwardly into the center of the housing so that a substantial portion of the tube is directly in the path of the hot gases flowing through the exhaust system.

As a further alternative, the housing 46 may be dispensed with and the tube 50' may be inserted directly into the exhaust conduit 14.

The operation of the embodiment of FIG. 4 is substantially the same as that of the embodiment of FIG. 2 in that liquid waste material is introduced through the inlet passage 55' to the tube 50'. As the waste material flows around the closed loop, it is vaporized by the heated condition of the exhaust assembly and passes out of the tube as a vapor through the outlet passage 56'.

Referring now to FIG. 6, there is illustrated a further modification of the waste disposal system of FIG. 1. Thus, as schematically illustrated in FIG. 6, a source of ultraviolet energy, indicated generally by the reference numeral 80, is connected in the outlet conduit assembly 30. The ultraviolet source is connected to the conduit assembly by a suitable valve 82 which, through a conduit 83, provides a means whereby the liquid material in the conduit 30 may be selectively diverted through the conduit to the ultraviolet source. The source may comprise a housing 74 to which the conduit 83 is connected by an appropriate fitting 85. Internally of the housing there is provided a source of ultraviolet energy in the form of a light 76 which may be connected to an appropriate source of electrical energy to generate the ultraviolet rays. A glass conduit 77 is connected to the fitting 85 with the conduit being spirally wound around the ultraviolet source and terminating in an outlet fitting 78 to which an outlet conduit 79 is also connected. The outlet conduit 79 may pass through a valve 90 which may be employed to channel the fluid in the conduit 79 either to a separate outlet through a conduit 81 or back to conduit 30.

With the above-described arrangement of FIG. 6, the liquid waste material in the tank 25 may be diverted through the valve 82 to the ultraviolet source 80 whereby the liquid, as it passes through the glass tubing 77 is subjected to the ultraviolet rays which will destroy at least some of the bacteria present in the liquid. The liquid continues through the conduit 79 back to the conduit 30 through the valve 90 where it is then channeled to the dissipatus apparatus for vaporization. Alternatively, and if conditions are appropriate, the ultraviolet treatment may be employed as the only treatment for the waste material and the waste material may be channeled by the valve 90 through the conduit 81 to a separate outlet if desired. Thus, with this modification, a second purifying means is available to treat the liquid waste with the additional purification means providing flexibility in the system in that, even without a source of heat available, the liquid waste material may be treated.

It will readily be understood that the flow of the liquid waste material through the ultraviolet source 80 will be controlled so that the material is exposed to the ultraviolet rays a sufficient amount of time.

Modifications and changes in the illustrated embodiments will suggest themselves to those having ordinary skill in the art. Changes such as these are contemplated by the principles of this invention so that although for ease of description, the principles of the invention have been set forth in connection with certain illustrated embodiments, it is not intended that these embodiments, or the terminology employed in describing them, are to be limiting but rather it is our desire to be restricted only by the scope of the appened claims.

Having thus described our invention, we claim:

1. An improved waste disposal system comprising, in combination, a power source for generating waste heated gases and an exhaust system therefor, said exhaust system including means for conducting the heated gases from the power source as a stream to the atmosphere, said disposal system including a waste tank for collecting liquid waste material and means connected to said tank operative to employ the waste heat in said exhaust system for vaporizing the waste liquid collected in said tank, the improvement comprising:

said vaporizing means including circulating means through which the liquid waste may be circulated with said circulating means having a portion thereof disposed in the exhaust system and positioned to be exposed to the stream of heated gases passing through said exhaust system when the power source is operating, said circulating means defining a closed path which maintains the waste liquid separate from the gases in the exhaust system.

2. The improvement of claim 1 wherein a pump is provided to supply liquid to said vaporizing means from said tank, and means responsive to the temperature in said exhaust system for controlling actuation of said pump.

3. The improvement of claim 1 and further including a source of ultraviolet energy, and means for exposing the liquid to said ultraviolet energy.

4. An improved waste disposal system comprising, in combination, a power source for generating waste heated gases and an exhaust system for conducting the heated gases from the power source as a stream to the atmosphere, said disposal system including a waste tank for receiving waste material for bacteriological treatment to convert said material to a liquid state, the improvement comprising:

first purifying means comprising a source of ultraviolet energy, conduit means for conducting the liquid from said waste tank past said ultraviolet source thereby to expose said liquid to said ultraviolet energy, means employing the waste heat in said exhaust system for vaporizing liquid, and means for selectively interconnecting said vaporizing means with said conduit means.

5. The improvement of claim 1 wherein said vaporizing means comprises a base adapted to be connected to said exhaust system, an opening through said base for permitting the passage of exhaust gases, a dissipatus tube supported on said base with at least a portion of said tube aligned with the opening in said base, a fluid passage in said tube, and means interconnecting said fluid passage with said waste tank.

6. The improvement of claim 5 wherein said means connecting said fluid passage with said waste tank includes a pump operative to supply liquid from said tank to said passage, and means responsive to the temperature of said dissipatus tube for controlling actuation of said pump.

7. The improvement of claim 5 wherein said dissipatus tube includes an injector tube in said fluid passage, an inlet passage in said base connected to said injector tube, and an outlet passage in said base in communication with said fluid passage.

8. The improvement of claim 5 wherein said interconnecting means includes an inlet passage in said base, an outlet passage in said base, said dissipatus tube comprising a closed loop interconnecting said inlet and outlet passages.

9. The improvement of claim 7 wherein a pump is provided to supply liquid from said tank to said dissipatus tube, and temperature responsive means on said base adjacent to said dissipatus tube, said temperature responsive means being operatively connected to said pump for controlling the actuation of said pump.

10. The improvement of claim 1 wherein said circulating means comprises a looped tube through which the waste liquid is passed and vaporized.

11. The improved disposal system of claim 1 wherein said exhaust system includes an exhaust pipe, and said vaporizing means includes adaptor means connecting said exhaust pipe to said vaporizing means whereby at least some of the waste heated gases passing through said exhaust pipe also pass through said vaporizing means.

References Cited

UNITED STATES PATENTS

| | | | |
|---|---|---|---|
| 2,452,201 | 10/1948 | Levinson et al. | |
| 2,998,139 | 8/1961 | Novak | 210—71 X |
| 3,342,337 | 9/1967 | Reid | 210—152 |
| 3,246,761 | 4/1966 | Bryan et al. | 210—187 X |
| 3,255,887 | 6/1966 | Walker et al. | 210—187 |

JOHN W. ADEE, Primary Examiner

U.S. Cl. X.R.

210—152, 181; 21—54